(12) United States Patent
Lee et al.

(10) Patent No.: US 12,222,194 B2
(45) Date of Patent: Feb. 11, 2025

(54) RADAR-ABSORBING FIBER-REINFORCED STRUCTURE USING PLASMA DISCHARGE OF FIBER-REINFORCED COMPOSITE AND STEALTH SYSTEM INCLUDING THE SAME

(71) Applicant: KOREA INSTITUTE OF SCIENCE AND TECHNOLOGY, Seoul (KR)

(72) Inventors: Hun-Su Lee, Jeollabuk-do (KR); Hyunsu Kim, Jeollabuk-do (KR); Minkook Kim, Jeollabuk-do (KR); Cheol-Min Yang, Jeollabuk-do (KR); Dongsu Lee, Jeollabuk-do (KR)

(73) Assignee: Korea Institute of Science and Technology, Seoul (KR)

( * ) Notice: Subject to any disclaimer, the term of this patent is extended or adjusted under 35 U.S.C. 154(b) by 379 days.

(21) Appl. No.: 17/559,889

(22) Filed: Dec. 22, 2021

(65) Prior Publication Data

US 2022/0221252 A1   Jul. 14, 2022

(30) Foreign Application Priority Data

Jan. 11, 2021   (KR) .......................... 10-2021-0003507

(51) Int. Cl.
*F41H 3/00*   (2006.01)
*B64C 23/00*   (2006.01)
*H01Q 17/00*   (2006.01)
*H05H 1/24*   (2006.01)

(52) U.S. Cl.
CPC ............. *F41H 3/00* (2013.01); *B64C 23/005* (2013.01); *H01Q 17/005* (2013.01); *H05H 1/2406* (2013.01); *H05H 1/2425* (2021.05)

(58) Field of Classification Search
CPC ...... B64C 23/005; H05H 1/2425; H05H 1/24; F41H 3/00
USPC ............................................................. 342/1
See application file for complete search history.

(56) References Cited

U.S. PATENT DOCUMENTS 7,255,062 B1 * 8/2007 Higman .................. H05H 1/46
118/723 AN
2002/0145554 A1   10/2002 Lloyd et al.
2012/0263935 A1 * 10/2012 Ledford ................ D03D 15/00
428/296.7

(Continued)

FOREIGN PATENT DOCUMENTS

CN   109769334 A   *   5/2019   ............... H01H 1/24
GB   2283369   *   3/1995   ............. H01Q 15/14

(Continued)

*Primary Examiner* — James R Hulka
*Assistant Examiner* — Samarina Makhdoom
(74) *Attorney, Agent, or Firm* — Rabin & Berdo, P.C.

(57) ABSTRACT

A radar-absorbing fiber-reinforced structure includes a fiber composite discharging part. The fiber composite discharging part includes a first electrode part and a second electrode part, which are spaced apart from each other by a dielectric layer and receive different voltages. The fiber composite discharging part is configured to discharge plasma in response to a voltage difference thereby changing a reflected wave or transmitted wave of a radar incident on the radar-absorbing fiber-reinforced structure to reduce reflectivity of the radar. At least one of the first electrode part and the second electrode part include a conductive fiber having a tensile strength equal to or more than 0.5 GPa.

13 Claims, 12 Drawing Sheets

(56) References Cited

U.S. PATENT DOCUMENTS

| | | | |
|---|---|---|---|
| 2016/0023777 A1* | 1/2016 | Jones | B64D 45/02 |
| | | | 29/825 |
| 2017/0301428 A1* | 10/2017 | Restuccia | C08L 63/00 |
| 2018/0194619 A1* | 7/2018 | Greer | B05D 1/18 |
| 2019/0074389 A1* | 3/2019 | Greer | H10K 71/12 |
| 2019/0204027 A1* | 7/2019 | Cohen | G02B 1/002 |
| 2020/0055058 A1 | 2/2020 | Alam et al. | |

FOREIGN PATENT DOCUMENTS

| | | |
|---|---|---|
| JP | 3393270 B2 | 4/2003 |
| JP | 2004363138 A | 12/2004 |
| KR | 100567189 B1 | 4/2006 |
| KR | 101573231 B1 | 12/2015 |
| KR | 101794048 B1 | 11/2017 |
| KR | 101951429 B1 | 2/2019 |

* cited by examiner

RADAR-ABSORBING FIBER-REINFORCED STRUCTURE USING PLASMA DISCHARGE OF FIBER-REINFORCED COMPOSITE AND STEALTH SYSTEM INCLUDING THE SAME

CROSS-REFERENCE TO RELATED APPLICATIONS

This application claims priority under 35 U.S.C. § 119 to Korean Patent Application No. 10-2021-0003507, filed on Jan. 11, 2021, and all the benefits accruing therefrom, the content of which is herein incorporated by reference in its entirety.

BACKGROUND

1. Field

Embodiments relate to a radar-absorbing fiber-reinforced structure. More particularly, embodiments relate to a radar-absorbing fiber-reinforced structure using plasma-discharging of a fiber-reinforced composite material and a stealth system including the same.

2. Description of the Related Art

A stealth technology, which is essential for increasing the survivability of various weapon systems in modern warfare, may be determined by a shaping technology, a radar-absorbing material (RAM), a radar-absorbing structure (RAS) or the like.

A shaping technology, which is a basic technology of the stealth technology, scatters an incident light not to be returned. However, as a radar technology has been developed, only a shaping technology hardly increases the survivability.

In order to overcome limitation of the shaping technology, a RAM has been developed. The RAM may be coated on a surface of a weapon system through painting or the like to absorb a radar (an electromagnetic wave). However, because the RAM has a low durability, repairs are periodically required. Furthermore, the RAM may increase weight of a weapon system thereby decreasing mobility or speed of the weapon system such as aircrafts.

Therefore, researches and developments are being actively conducted on a RAS, which may support a load and absorb a radar, and a complex structure is being focused as the RAS.

A conventional RAS composite is formed by adding a nano particle, which is a lossy material, such as carbon nano tubes (CNT), carbon black (CB), carbon nano fiber (CNF) or the like to a matrix material.

In order to increase a radar-absorbing ability of the RAS composite, it is necessary to disperse the nano particle in the matrix with a large weight percent. However, when the nano particle is dispersed in the matrix with a large weight percent, a viscosity of the matrix is increased. Thus, a shaping method may be changed a radar-absorbing ability may be deteriorated, and uncertainty of designing of the RAS composite may be increased by irregularity of dispersion.

SUMMARY

Embodiments provide a radar-absorbing fiber-reinforced structure having an improved radar-absorbing ability and an improved mechanical property.

Embodiments provide a stealth system using the radar-absorbing fiber-reinforced structure.

According to an embodiment, a radar-absorbing fiber-reinforced structure includes a fiber composite discharging part. The fiber composite discharging part includes a first electrode part and a second electrode part, which are spaced apart from each other by a dielectric layer and receive different voltages. The fiber composite discharging part is configured to discharge plasma in response to a voltage difference thereby changing a reflected wave or transmitted wave of a radar incident on the radar-absorbing fiber-reinforced structure to reduce reflectivity of the radar. At least one of the first electrode part and the second electrode part include a conductive fiber having a tensile strength equal to or more than 0.5 GPa.

In an embodiment, at least one of the first electrode part and the second electrode part include a conductive fiber bundle.

In an embodiment, at least one of the first electrode part and the second electrode part include a fabric structure consisting of a conductive fiber bundle and a non-conductive fiber bundle.

In an embodiment, the radar-absorbing fiber-reinforced structure further includes a radar-entering part disposed on a front surface of the fiber composite discharging part.

In an embodiment, the radar-entering part may include a radar-absorbing material.

In an embodiment, the radar-entering part may include a fiber-reinforced plastic material.

In an embodiment, the radar-entering part may include a non-conductive material.

In an embodiment, the radar-absorbing fiber-reinforced structure further includes a spacing structure disposed between the fiber composite discharging part and the radar-entering part and including a discharging space for plasma.

In an embodiment, the spacing structure includes an opening to form the discharging space and having a honeycomb shape.

In an embodiment, the spacing structure includes a first spacing structure and a second spacing structure, which are disposed in different layers.

In an embodiment, the first and second spacing structures have different sizes or different shapes so that a plasma density in the first spacing structure is different from a plasma density in the second spacing structure.

In an embodiment, the spacing structure is sealed and connected to a pressure-adjusting apparatus to control a pressure in the discharging space.

In an embodiment, the spacing structure includes a pressure-adjusting portion connected to an outside to adjust a pressure in the discharging space in response to a pressure of an outside.

According to an embodiment, a stealth system includes the radar-absorbing fiber-reinforced structure and a pulse-radar detection apparatus adjacent to the radar-absorbing fiber-reinforced structure. The radar-absorbing fiber-reinforced structure is operated to generate plasma when a pulse-radar is not emitted by the pulse-radar detection apparatus.

According to the embodiments, a radar-absorbing ability of a radar-absorbing fiber-reinforced structure may be improved by using plasma.

Furthermore, a fiber composite discharging part is used for generating plasma. Thus, a radar-absorbing fiber-reinforced structure having mechanical properties suitable for aircrafts may be achieved.

Furthermore, adding a spacing structure may increase a plasma density and may easily control plasma.

Furthermore, adding a radar-entering part may improve a radar-absorbing ability or may prevent a light generated by plasma from being perceived.

BRIEF DESCRIPTION OF THE DRAWINGS

The above and other features and advantages will become more apparent by describing embodiments thereof with reference to the accompanying drawings, in which.

DETAILED DESCRIPTION

Figure 1:
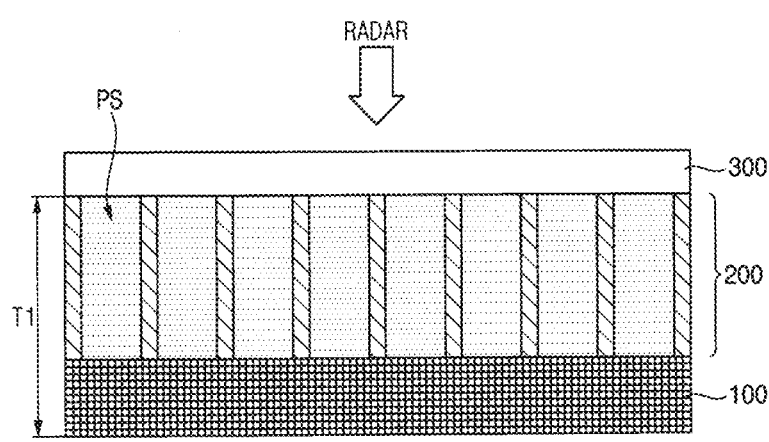
FIG. 1 is a cross-sectional view illustrating a radar-absorbing fiber-reinforced structure according to an embodiment.

Embodiments are described more fully hereinafter with reference to the accompanying drawings. The inventive concept may, however, be embodied in many different forms and should not be construed as limited to the embodiments set forth herein. In the drawings, the sizes and relative sizes of layers and regions may be exaggerated for clarity. It will be understood that, although the terms first, second, third etc. may be used herein to describe various elements, components, regions, layers, patterns and/or sections, these elements, components, regions, layers, patterns and/or sections should not be limited by these terms. These terms are only used to distinguish one element, component, region, layer pattern or section from another region, layer, pattern or section. Thus, a first element, component, region, layer or section discussed below could be termed a second element, component, region, layer or section without departing from the teachings of embodiments.

Embodiments are described herein with reference to cross sectional illustrations that are schematic illustrations of illustratively idealized embodiments (and intermediate structures) of the inventive concept. As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the inventive concept.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2A:
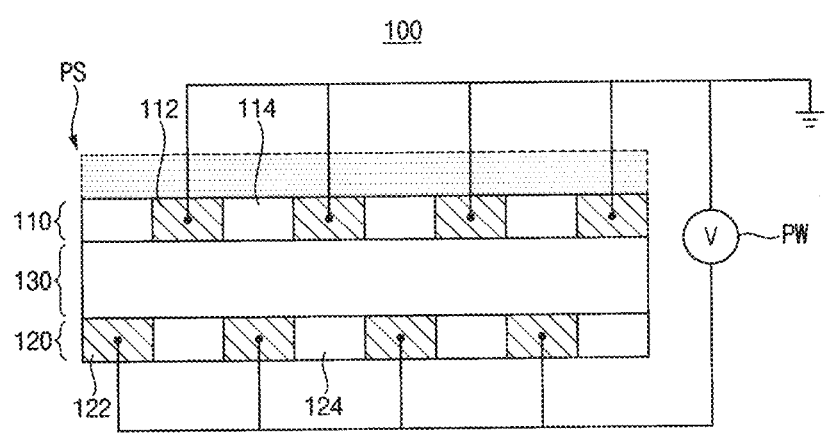
FIGS. 2A and 2B are cross-sectional views schematically illustrating a fiber composite discharging part of a radar-absorbing fiber-reinforced structure according to an embodiment.
Figure 2B:
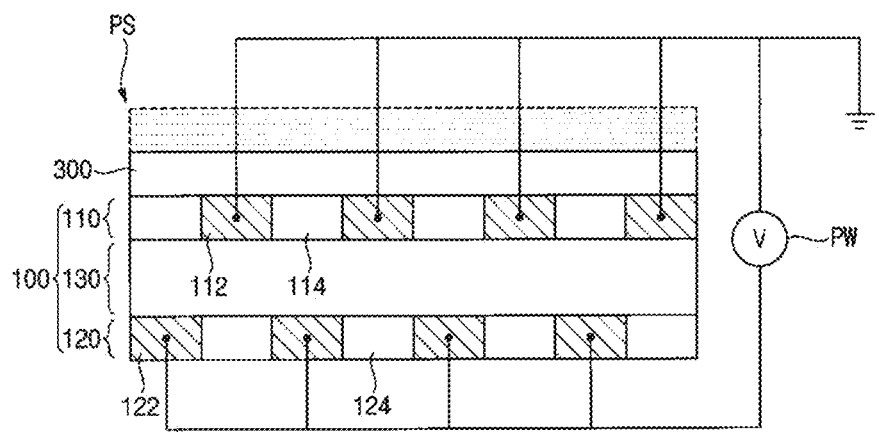
Figure 3:
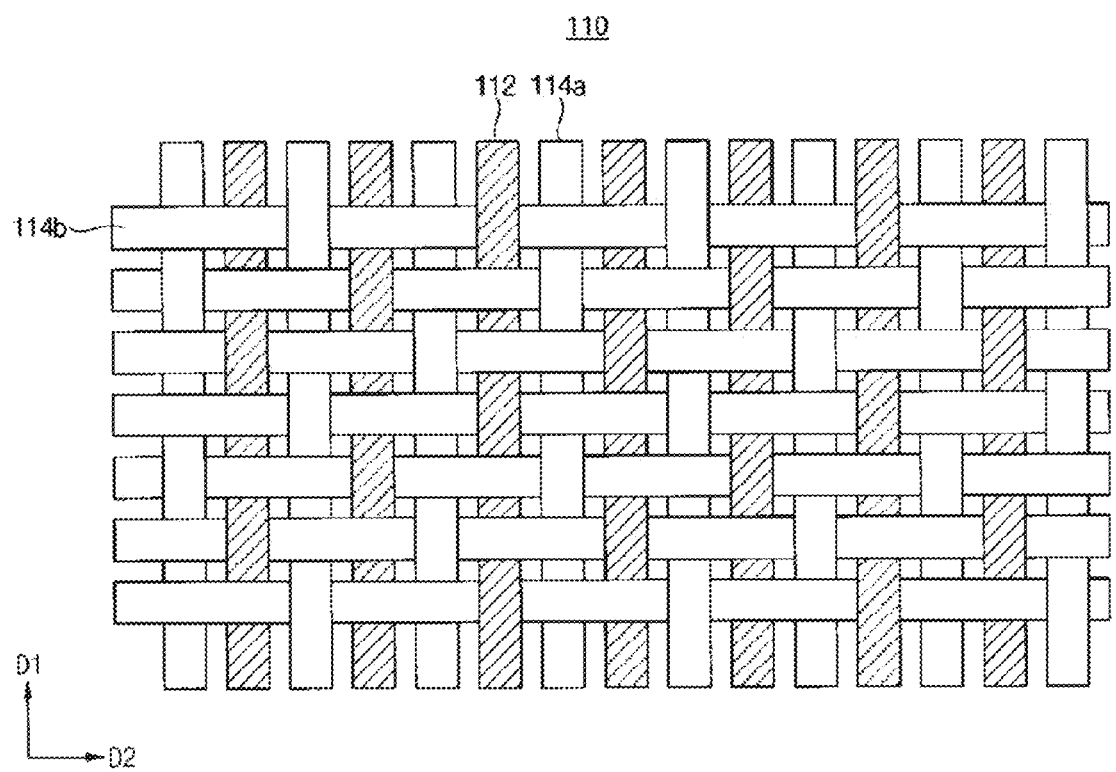
FIG. 3 is a plan view illustrating a fiber composite discharging part of a radar-absorbing fiber-reinforced structure according to an embodiment.
Figure 4:
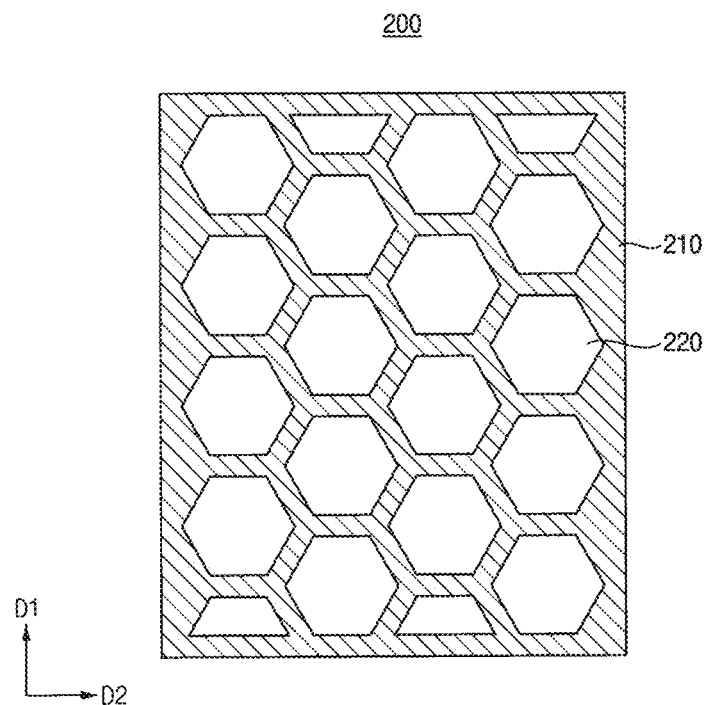
FIG. 4 is a plan view illustrating a spacing structure of a radar-absorbing fiber-reinforced structure according to an embodiment.
Figure 5:
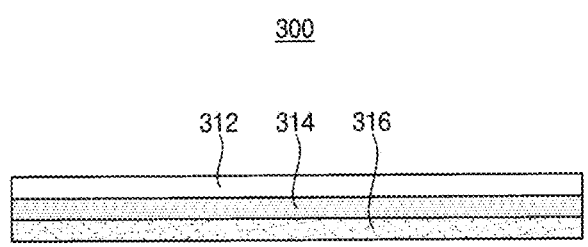
FIG. 5 is a cross-sectional view illustrating a radar-entering part of a radar-absorbing fiber-reinforced structure according to an embodiment.

FIG. 1 is a cross-sectional view illustrating a radar-absorbing fiber-reinforced structure according to an embodiment. FIGS. 2A and 2B are cross-sectional views schematically illustrating a fiber composite discharging part of a radar-absorbing fiber-reinforced structure according to an embodiment. FIG. 3 is a plan view illustrating a fiber composite discharging part of a radar-absorbing fiber-reinforced structure according to an embodiment. FIG. 4 is a plan view illustrating a spacing structure of a radar-absorbing fiber-reinforced structure according to an embodiment. FIG. 5 is a cross-sectional view illustrating a radar-entering part of a radar-absorbing fiber-reinforced structure according to an embodiment.

Referring to FIG. 1, a radar-absorbing fiber-reinforced structure includes a fiber composite discharging part 100, a spacing structure 200 disposed at least a surface of the fiber composite discharging part 100 and a radar-entering part 300 covering the spacing structure 200. The radar-absorbing fiber-reinforced structure may be configured so that a radar may enter the radar-absorbing fiber-reinforced structure through the radar-entering part 300. Thus, the radar-entering part 300 may be disposed on a front surface (an upper surface) of the fiber composite discharging part 100 and the spacing structure 200.

Referring to FIG. 2A, the fiber composite discharging part 100 includes a first electrode part 110, a second electrode part 120 spaced apart from the first electrode part 110 and a dielectric layer 130 disposed between the first electrode part 110 and the second electrode part 120.

In an embodiment, at least one of the first electrode part 110 and the second electrode part 120 include a conductive fiber. For example, the first electrode part 110 and the second electrode part 120 may each have a fabric structure including a conductive fiber and a non-conductive fiber. For example, the conductive fiber may have a tensile strength of at least about 0.5 GPa.

For example, the first electrode part 110 may include a conductive fiber bundle 112 and a non-conductive fiber bundle 114, which are alternately arranged. The conductive fiber bundle 112 and the non-conductive fiber bundle 114 may be alternately woven. For example, as illustrated in FIG. 3, the first electrode part 110 may include a conductive fiber bundle 112 extending along a first direction D1, a first non-conductive fiber bundle 114a extending along the first direction D1 and arranged alternately with the conductive fiber bundle 112, and a second non-conductive fiber bundle 114b crossing the first non-conductive fiber bundle 114a and the conductive fiber bundle 112.

However, embodiments are not limited thereto. For example, the conductive fiber bundle 112 and the non-conductive fiber bundle 114 may be arranged to extend along the same direction. Furthermore, at least one of the first electrode part 110 and the second electrode part 120 may consist of a conductive fiber bundle.

The conductive fiber bundle 112 includes a conductive material to have an electric conductivity. For example, a fiber of the conductive fiber bundle 112 may be a carbon fiber, may include a conductive material therein or coated thereon. The conductive material may include a conductive polymer, a graphite, a grapheme, a carbon particle or a metal.

The non-conductive fiber bundle 114 may include a fiber having superior mechanical properties. For example, the non-conductive fiber bundle 114 may include Kevlar, a glass fiber, ultra high molecular weight polyethylene or the like.

In an embodiment, the second electrode part 120 may include a conductive fiber bundle 122 and a non-conductive fiber bundle 124, which are alternately arranged. The conductive fiber bundle 122 and the non-conductive fiber bundle 124 may be alternately woven. For example, the second electrode part 120 may have a configuration same as or similar to the first electrode part 110.

The dielectric layer 130 may include a dielectric material. For example, the dielectric layer 130 may include a cured polymeric resin of an epoxy resin, an urethane resin, a phenolic resin or the like. However, embodiments are not limited thereto. For example, the dielectric layer 130 may include a thermoplastic polymer, or may have a fabric structure including a glass fiber, Kevlar or the like. Furthermore, at least a portion of the dielectric layer 130 may have a through part or opening like a honeycomb structure.

For example, the fiber composite discharging part 100 may be obtained by impregnating fabric structures, which correspond to the first electrode part 110 and the second electrode part 120, with an epoxy resin or the like and curing the resin with the fabric structures.

In an embodiment, the conductive fiber bundles 112 and 122 of the first electrode part 110 and the second electrode part 120 may be each connected to a power supplier PW. The power supplier PW may induce a voltage difference between the first electrode part 110 and the second electrode part 120. However, embodiments are not limited thereto. For example, one of the first electrode part 110 and the second electrode part 120 may be connected to the power supplier PW and the other may be grounded.

In an embodiment, a radar-absorbing fiber-reinforced structure may consist of a fiber composite discharging part without and a radar-entering part and a spacing structure. In this case, as illustrated in FIG. 2A, plasma PS may be discharged above the first electrode part 110 of the fiber composite discharging part.

In another embodiment, a radar-absorbing fiber-reinforced structure may consist of a fiber composite discharging part and a radar-entering part without a spacing structure. In this case, as illustrated in FIG. 2B, plasma PS may be discharged above the radar-entering part 300.

Referring to FIG. 4, the spacing structure 200 may include a partition wall 210 and an opening 220 defined between partition walls 210 adjacent to each other to form a discharging space. For example, the opening 220 may pass through the spacing structure 200 in a vertical direction.

The spacing structure 200 may include a non-conductive material. For example, the spacing structure 200 may include glass fiber reinforced plastic (GFRP). The spacing structure 200 including GFRP may have a superior physical durability.

In an embodiment, the spacing structure 200 may have a honeycomb structure. Such configuration may increase mechanical properties of the spacing structure 200. However, embodiments are not limited thereto, and structure of the spacing structure 200 may be variously changed.

When a voltage difference is induced between the first electrode part 110 and the second electrode part 120 by the power supplier PW, plasma PS may be generated in an area adjacent to the conductive fiber bundles 112 and 122. Thus, reflected wave or transmitted wave of an incident radar may be changed thereby decreasing a reflectivity of the radar.

For example, the voltage difference may be at least about 1 kV. As the voltage difference is increased, a radar-absorbing ability may be increased. For example, the voltage difference may be preferably at least about 5 kV. When the voltage difference is excessively large, a composite may be damaged.

The spacing structure 200 may be adjacent to the fiber composite discharging part 100 to provide a space for discharging and receiving plasma PS in the radar-absorbing fiber-reinforced structure. Thus, a plasma density may be increased, and plasma may be easily controlled. Furthermore, a light exiting from the radar-absorbing fiber-reinforced structure may be reduced or minimized by the spacing structure 200.

In an embodiment, the spacing structure 200 may be sealed. For example, a sealing layer may be disposed on or under the spacing structure 200 to seal or encapsulate the spacing structure 200, or the spacing structure 200 may be sealed by other components adjacent thereto. If an inert gas such as argon, helium or the like is provided in the discharging space, plasma may be discharged by less voltage difference. Thus, power consumption may be improved, and a plasma density may be increased.

The radar-entering part 300 may have a configuration suitable for minimizing reflectance of a radar and for increasing a radar-absorbing ability.

For example, the radar-entering part 300 may include a ceramic material to increase heat resistance, or may include a composite material such as a fiber-reinforced plastic material to increase mechanical properties.

Furthermore, the radar-entering part 300 may include a RAM to absorb a radar. For example, the RAM may include carbon nano tubes (CNT), carbon black (CB), carbon nano fiber or the like.

Furthermore, the radar-entering part 300 and the spacing structure 200 may include a light-blocking material to prevent a light generated by plasma from being perceived outside. The light-blocking material may include a conventional light-blocking material such as a pigment, a dye, carbon black or the like.

For example, as illustrated in FIG. 5, the radar-entering part 300 may include a light-absorbing layer 316 including a light-blocking material, a radar-absorbing layer 314 disposed on the light-absorbing layer 316 and including a radar-absorbing material, and a protective layer 312 disposed on the radar-absorbing layer 314 and including a ceramic material, a fiber-reinforced plastic or the like.

In an embodiment, the radar-absorbing fiber-reinforced structure may be designed such that summation T1 of a thickness of the spacing structure 200 and a thickness of the fiber composite discharging part 100 may be approximate to ¼ of band of an electromagnetic wave to be absorbed. Such configuration may increase a radar-absorbing ability of the radar-absorbing fiber-reinforced structure by destructive interference. However, embodiments are not limited thereto, and a thickness of the spacing structure 200 and a thickness of the fiber composite discharging part 100 may be may be variously adjusted. For example, permittivity/magnetic permeability of the discharging space may be adjusted by plasma to minimize an electromagnetic wave passing therethrough so as to minimize a thickness of the spacing structure 200, or a radar-absorbing ability of a stealth system may be optimized or maximized by adjusting a reflecting-absorbing characteristic by plasma.

Hereinafter, various embodiments will be explained with reference to accompanying drawings.

Figure 6:
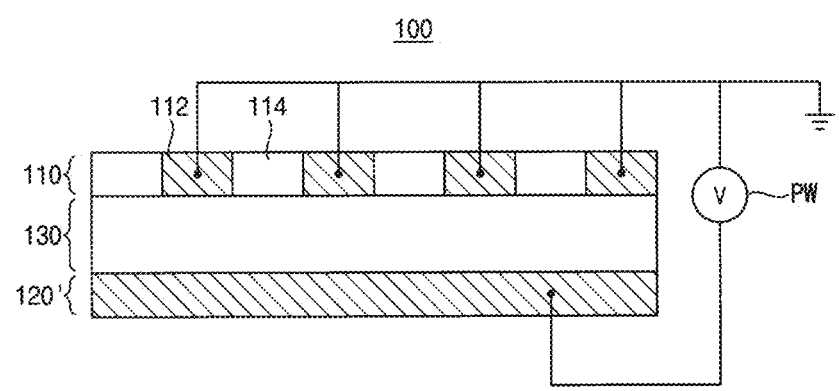
FIGS. 6, 7 and 8 are cross-sectional views schematically illustrating a fiber composite discharging part of a radar-absorbing fiber-reinforced structure according to embodiments.
Figure 7:
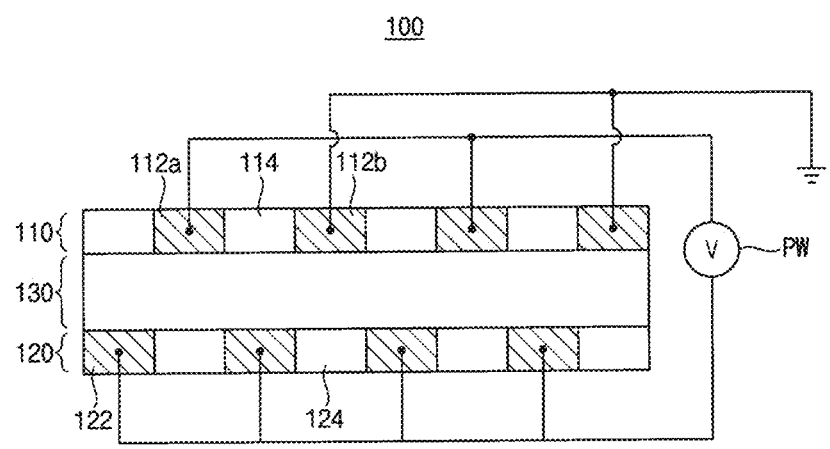
Figure 8:
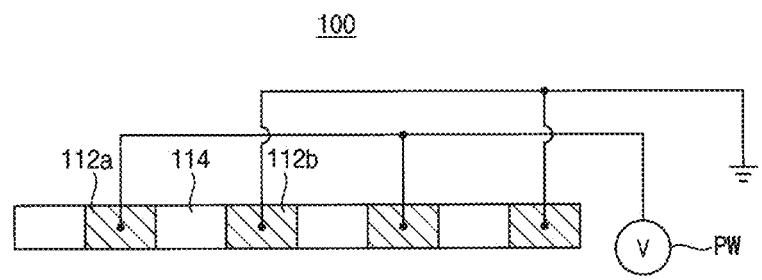

FIGS. 6, 7 and 8 are cross-sectional views schematically illustrating a fiber composite discharging part of a radar-absorbing fiber-reinforced structure according to embodiments.

Referring to FIG. 6, a fiber composite discharging part 100 includes a first electrode part 110, a second electrode part 120' spaced apart from the first electrode part 110 and a dielectric layer 130 disposed between the first electrode part 110 and the second electrode part 120'.

In an embodiment, the first electrode part 110 includes a conductive fiber. For example, the first electrode part 110 may include a conductive fiber bundle 112 and a non-conductive fiber bundle 114, which are alternately arranged.

The second electrode part 120' may include a conductor not having a fiber shape. For example, the second electrode part 120' may include a metal foil, a metal mesh or the like.

In the following embodiments, an electrode part, which is grounded, may be changed as desired. For example, when a first electrode part is grounded, and when a second electrode part is connected to a power supplier, it may be safer for people or other device to contact the radar-absorbing fiber-reinforced structure outside. When the second electrode part is grounded, and when the first electrode part is connected to the power supplier, stable operation of a stealth system may be possible because the second electrode part may be electrically connected to a surface of vehicles or aircrafts.

Referring to FIG. 7, a first electrode part 110 of a fiber composite discharging part 100 may include a plurality of conductive fiber bundles, and different voltages may be applied to conductive fiber bundles adjacent to each other to induce a voltage difference between adjacent conductive fiber bundles. For example, different voltages may be applied to a first conductive fiber bundle 112a and a second conductive fiber bundle 112b adjacent to the first conductive fiber bundle 112a.

Such configuration may increase a plasma density generated by the fiber composite discharging part 100.

Referring to FIG. 8, a fiber composite discharging part 100 may include a first conductive fiber bundle 112a and a second conductive fiber bundle 112b, which are disposed in different layers and receive different voltages. A non-conductive fiber bundle 114 or a different dielectric member may be disposed between the conductive fiber bundle 112a and the second conductive fiber bundle 112b.

Such configuration may implement a discharging part having a single fabric structure.

Figure 9:
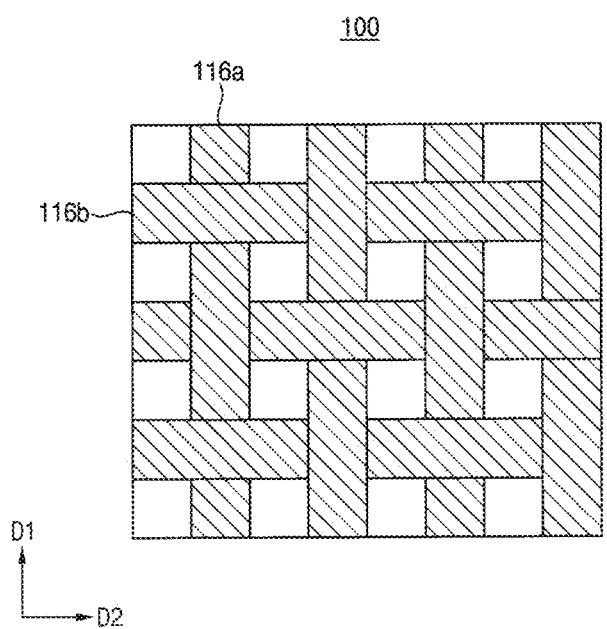
FIG. 9 is a plan view illustrating a fiber composite discharging part of a radar-absorbing fiber-reinforced structure according to an embodiment.
Figure 10:
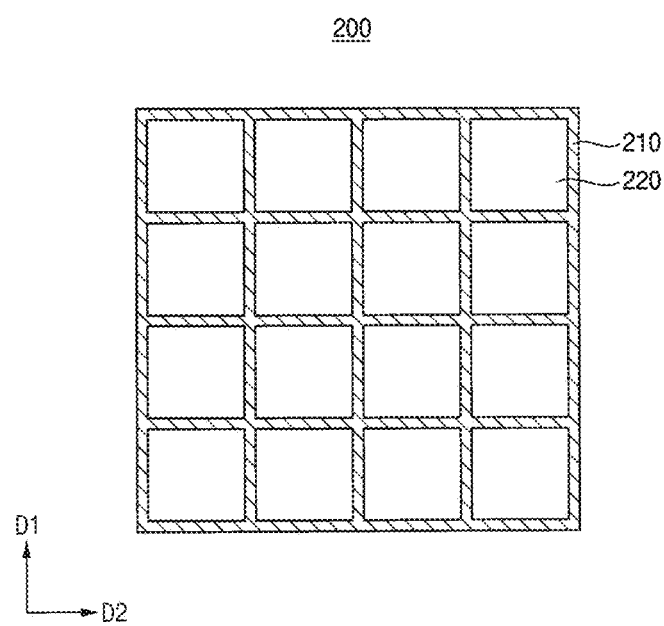
FIG. 10 is a plan view illustrating a spacing structure of a radar-absorbing fiber-reinforced structure according to an embodiment.

FIG. 9 is a plan view illustrating a fiber composite discharging part of a radar-absorbing fiber-reinforced structure according to an embodiment. FIG. 10 is a plan view illustrating a spacing structure of a radar-absorbing fiber-reinforced structure according to an embodiment.

Referring to FIG. 9, an electrode part of a fiber composite discharging part 100 may include conductive fiber bundles crossing each other. For example, the electrode part of the fiber composite discharging part 100 may include a first conductive fiber bundle 116a extending along a first direction D1 and a second conductive fiber bundle 116b extending along a second direction D2 perpendicular to the first direction D1.

The first conductive fiber bundle 116a and the second conductive fiber bundle 116b may be woven with each other into a fabric. Furthermore, the electrode part of the fiber composite discharging part 100 may further include a non-conductive fiber bundle extending in a direction parallel to the first conductive fiber bundle 116a or the second conductive fiber bundle 116b.

As illustrated in the drawings, a shape of a conductive area in a fiber composite discharging part 100 may be variously designed. Changing the shape of the conductive area may adjust an absorbed-band of an electromagnetic wave.

Referring to FIG. 10, a spacing structure 200 may include a partition wall 210 and an opening 220 defined by the partition wall 210 to form a discharging space.

In an embodiment, the partition wall 210 and the discharging space defined thereby may have a rectangular shape in a plan view. However, embodiments are not limited thereto. The partition wall 210 and the discharging space defined thereby may have various shapes including a triangular shape, an octagonal shape, a circular shape, an oval shape, a zigzag shape, a convexo-concave shape and the like.

FIGS. 11, 12, 13, 14, 15, 16, 17, 18, 19 and 20 are cross-sectional views illustrating a radar-absorbing fiber-reinforced structure according to embodiments.

Figure 11:
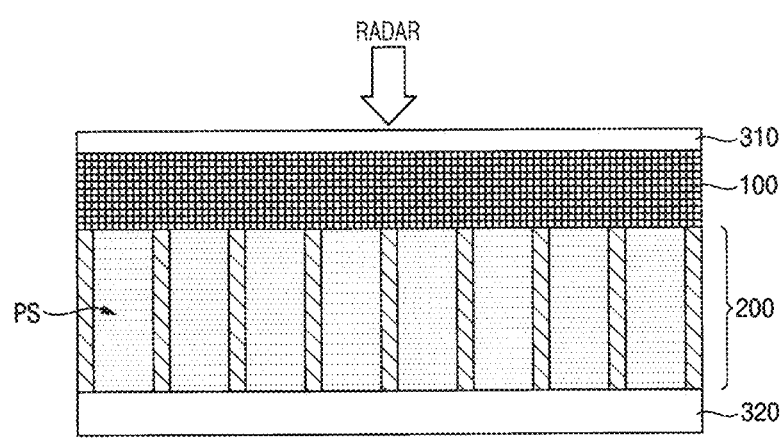
FIGS. 11, 12, 13, 14, 15, 16, 17, 18, 19 and 20 are cross-sectional views illustrating a radar-absorbing fiber-reinforced structure according to embodiments.

Referring to FIG. 11, a radar-absorbing fiber-reinforced structure includes a fiber composite discharging part 100, a spacing structure 200 disposed at least a surface of the fiber composite discharging part 100 and a radar-entering part 310.

In an embodiment, the fiber composite discharging part 100 may be disposed between the radar-entering part 310 and the spacing structure 200.

The radar-absorbing fiber-reinforced structure may further include a conductive plate 320 disposed under the spacing structure 200.

Figure 12:
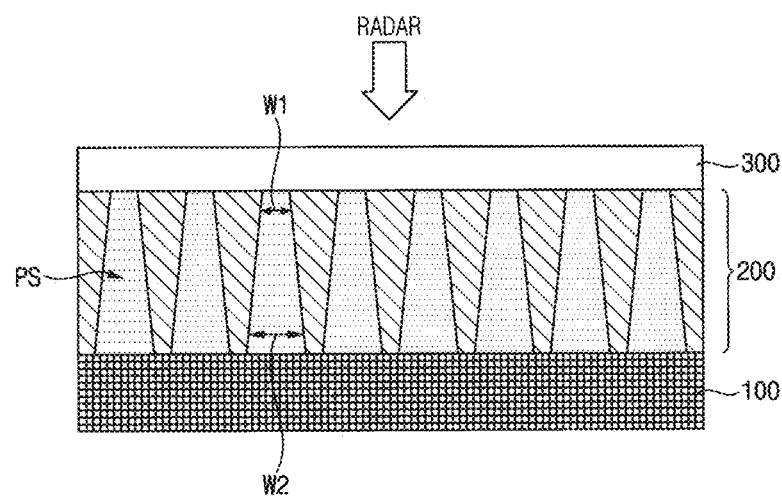

Referring to FIG. 12, a radar-absorbing fiber-reinforced structure includes a fiber composite discharging part 100, a spacing structure 200 disposed at least a surface of the fiber composite discharging part 100 and a radar-entering part 300 covering the spacing structure 200.

In an embodiment, a discharging space of the spacing structure 200 may have a shape tapered along a vertical direction (thickness direction). For example, a width W1 of an upper portion of the discharging space, which is adjacent to the radar-entering part 300, may be less than a width W2 of a lower portion of the discharging space, which is adjacent to the fiber composite discharging part 100. A width of the discharging space may be gradually increased toward the fiber composite discharging part 100.

Figure 13:
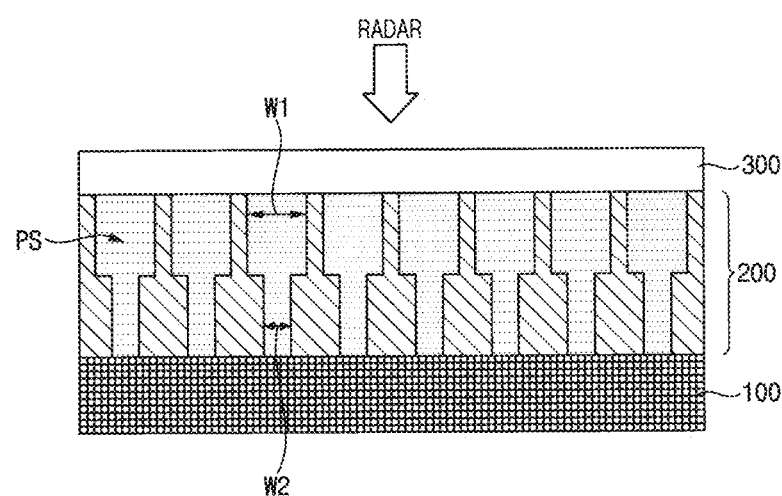

Referring to FIG. 13, a discharging space of a spacing structure 200 may have different widths thereby forming a step shape. For examples, a width W1 of an upper portion of the discharging space, which is adjacent to a radar-entering part 300, may be greater than a width W2 of a lower portion of the discharging space, which is adjacent to a fiber composite discharging part 100.

When the discharging space of the spacing structure varies as illustrated in FIGS. 12 and 13, plasma factors such as a plasma density or an electron temperature may be varied and controlled in the discharging space. Thus, the discharging space may be substantially expanded, or the plasma factor may be optimized.

Figure 14:
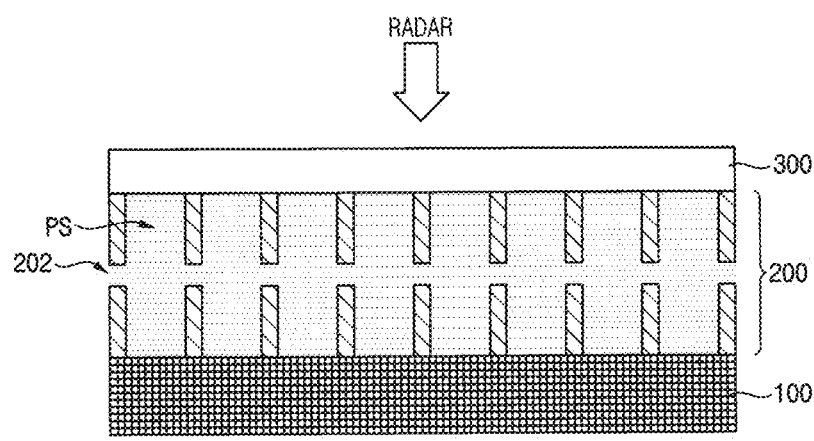

Referring to FIG. 14, a radar-absorbing fiber-reinforced structure includes a fiber composite discharging part 100, a spacing structure 200 disposed at least a surface of the fiber composite discharging part 100 and a radar-entering part 300 covering the spacing structure 200.

In an embodiment, the spacing structure 200 may include a pressure-adjusting portion 202 connected to outside. For example, the pressure-adjusting portion 202 may include a hole having a small size.

When the radar-absorbing fiber-reinforced structure is used for aircrafts or the like, the radar-absorbing fiber-reinforced structure may be operated at a low pressure as the aircrafts rise. In an embodiment, when a discharging pressure is less than an air pressure, an electromagnetic-absorbed bandwidth may be increased.

In an embodiment, because the spacing structure 200 includes the pressure-adjusting portion 202 connected to outside, the discharging pressure may be reduced in a low pressure environment. Thus, an electromagnetic-absorbed bandwidth may be increased.

Figure 15:
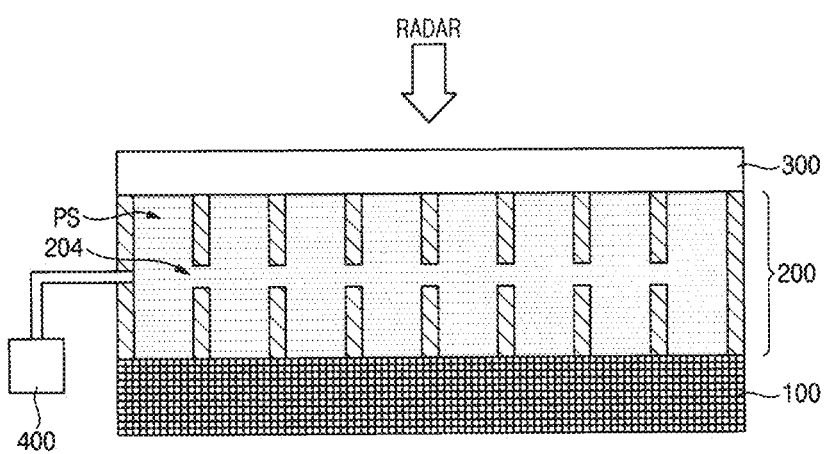

Referring to FIG. 15, a spacing structure 200 may be sealed, the spacing structure 200 may be connected to a pressure-adjusting apparatus 400. In this case, a pressure in a discharging space of the spacing structure 200 may be independently controlled by the pressure-adjusting apparatus 400.

Such configuration may precisely control a pressure in the spacing structure 200. A pressure in the spacing structure 200 may be increased or decreased to adjust plasma factors. For example, a pressure in the spacing structure 200 may be decreased to increase an electromagnetic-absorbed bandwidth. In an embodiment, a pressure in the spacing structure 200 may be controlled to be equal to or less than about 0.3 Torr. In another embodiment, a pressure in the spacing structure 200 may be controlled to be equal to or less than about 0.1 Torr.

Figure 16:
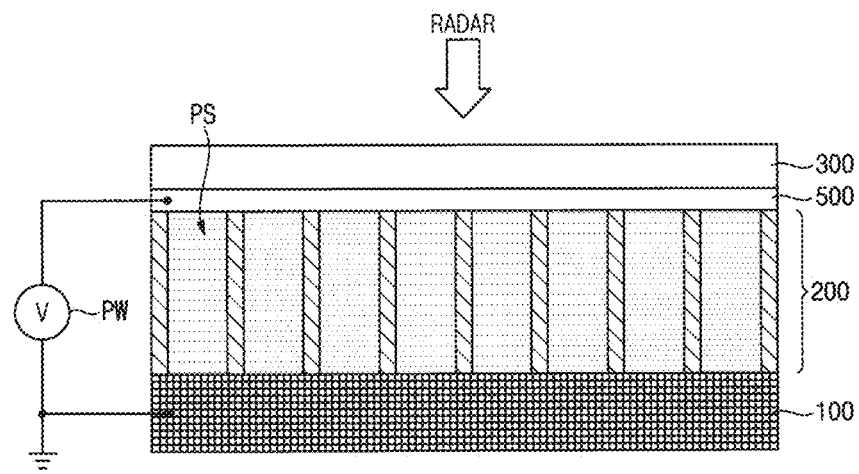

Referring to FIG. 16, a radar-absorbing fiber-reinforced structure includes a fiber composite discharging part 100, a spacing structure 200 disposed at least a surface of the fiber composite discharging part 100, a radar-entering part 300 covering the spacing structure 200 and an opposing electrode part 500 disposed between the spacing structure 300 and the radar-entering part 300.

In an embodiment, the opposing electrode part 500 may be electrically connected to a power supplier PW to receive a predetermined voltage. For example, a voltage applied to the opposing electrode part 500 may be different from a voltage applied to the fiber composite discharging part 100.

Thus, plasma may be generated in a discharging space between the opposing electrode part 500 and the fiber composite discharging part 100.

In an embodiment, the opposing electrode part 500 may include a mesh-shaped conductor, a conductive layer including nano carbon material such as carbon nano tube, or a nano carbon composite material to reduce radar reflection. The nano carbon composite material may be configured to have a radar-absorbing ability to increase radar-absorbing ability of the radar-absorbing fiber-reinforced structure.

Figure 17:
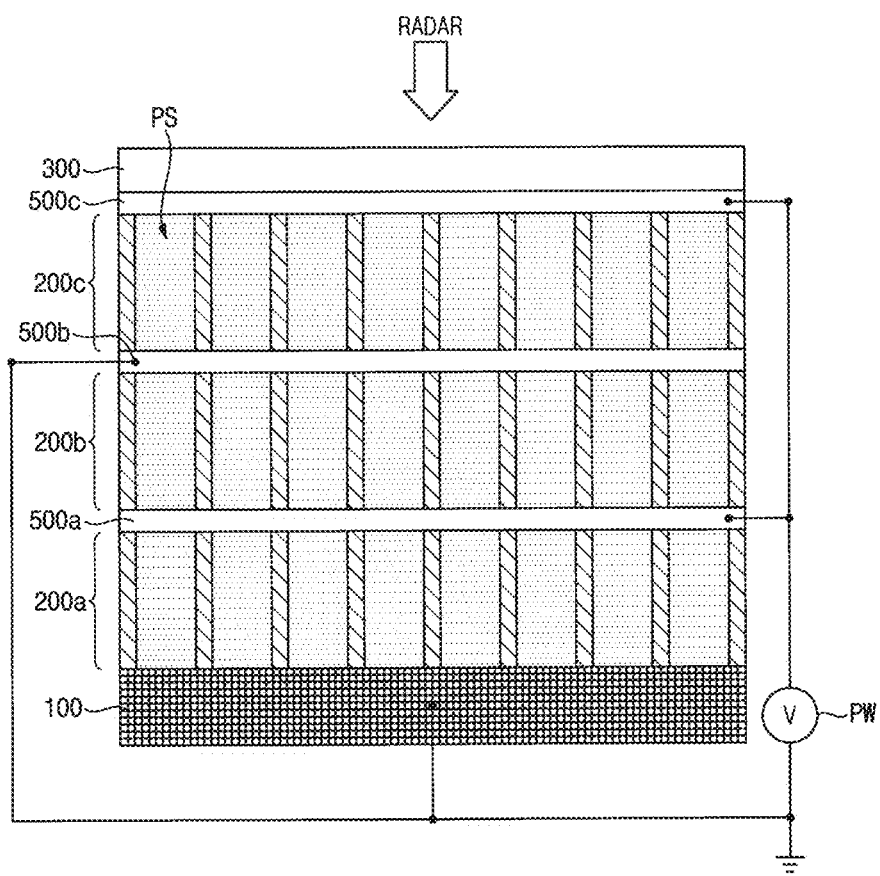

Referring to FIG. 17, a radar-absorbing fiber-reinforced structure may include a plurality of spacing structures. For example, the radar-absorbing fiber-reinforced structure may include a first spacing structure 200a, and a second spacing structure 200b and a third spacing structure 200c, which are disposed between a radar-entering part 300 and a fiber composite discharging part 100. However, embodiments are not limited thereto. For example, a radar-absorbing fiber-reinforced structure according to embodiment may include two spacing structures or at least four spacing structures.

The radar-absorbing fiber-reinforced structure may include a plurality of opposing electrode parts to discharge plasma in the spacing structures. For example, the radar-absorbing fiber-reinforced structure may include a first opposing electrode part 500a disposed between the first spacing structure 200a and the second spacing structure 200b, a second opposing electrode part 500b disposed between the second spacing structure 200b and the third spacing structure 200c, and a third opposing electrode part 500c disposed between the third spacing structure 200c and the radar-entering part 300.

In an embodiment, a first voltage may be applied to the fiber composite discharging part 100 and the second opposing electrode part 500b, and a second voltage different from the first voltage may be applied to the first opposing electrode part 500a and the third opposing electrode part 500c. As a result, a voltage difference may be applied to the first opposing electrode part 500a, the second opposing electrode part 500b and the third opposing electrode part 500c.

The opposing electrodes parts 500a, 500b and 500c may each include a mesh-shaped conductor, a conductive layer including nano carbon material such as carbon nano tube, or a nano carbon composite material to reduce radar reflection.

In an embodiment, plasma having different densities in the spacing structures may be generated.

Such configuration may increase a thickness of a discharging spaced where plasma is generated thereby increasing a radar-absorbing ability.

Furthermore, the opposing electrodes parts 500a, 500b and 500c may be configured to have different mesh shapes thereby controlling absorption and transmission of radar independently in each layers.

Furthermore, the spacing structures 200a, 200b and 200c may be configured to have different inner pressures or to include different gases (discharging gases) thereby controlling plasma factors independently in each layers.

Figure 18:
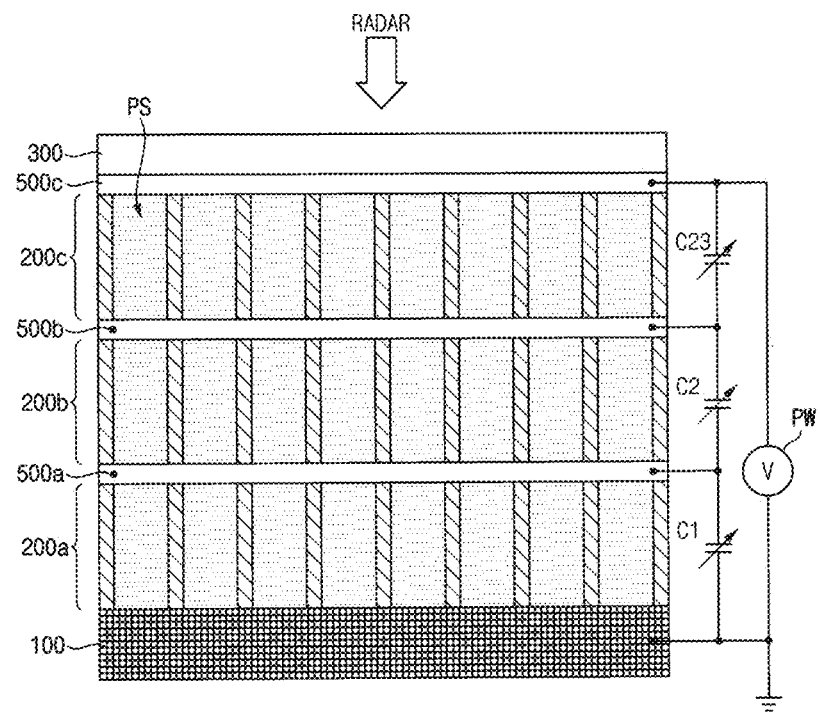

Referring to FIG. 18, a radar-absorbing fiber-reinforced structure may include a plurality of spacing structures. For example, the radar-absorbing fiber-reinforced structure may include a first spacing structure 200a, and a second spacing structure 200b and a third spacing structure 200c, which are disposed between a radar-entering part 300 and a fiber composite discharging part 100.

The radar-absorbing fiber-reinforced structure may include a plurality of opposing electrode parts to discharge plasma in the spacing structures. For example, the radar-absorbing fiber-reinforced structure may include a first opposing electrode part 500*a* disposed between the first spacing structure 200*a* and the second spacing structure 200*b*, a second opposing electrode part 500*b* disposed between the second spacing structure 200*b* and the third spacing structure 200*c*, and a third opposing electrode part 500*c* disposed between the third spacing structure 200*c* and the radar-entering part 300.

In an embodiment, opposing electrode parts interposing each spacing structures may be connected to a variable capacitor. For example, a first variable capacitor C1 may be electrically connected between the fiber composite discharging part 100 and the first opposing electrode part 500*a*. A second variable capacitor C2 may be electrically connected between the first opposing electrode part 500*a* and the second opposing electrode part 500*b*. A third variable capacitor C3 may be electrically connected between the second opposing electrode part 500*b* and the third opposing electrode part 500*c*.

Such configuration may independently control plasma densities and/or plasma factors for each spacing structures without individual power suppliers. Thus, even if an electron density of a radar passing through the spacing structures varies by blocking electrons, a radar may be effectively absorbed in response thereto.

Figure 19:
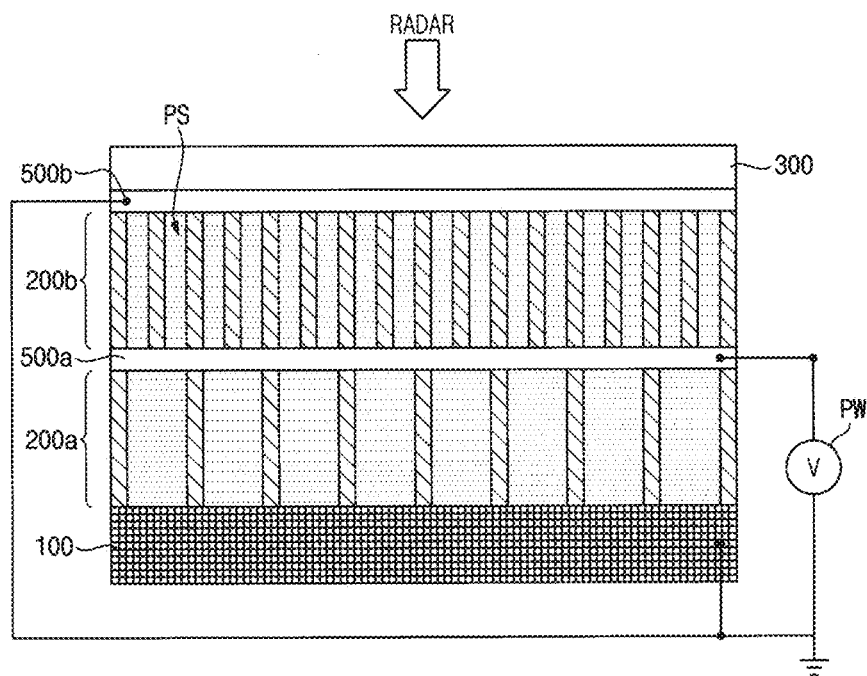

Referring to FIG. 19, a radar-absorbing fiber-reinforced structure may include a plurality of spacing structures. For example, the radar-absorbing fiber-reinforced structure may include a first spacing structure 200*a* and a second spacing structure 200*b*, which are disposed between a radar-entering part 300 and a fiber composite discharging part 100.

The radar-absorbing fiber-reinforced structure may include a plurality of opposing electrode parts to discharge plasma in the spacing structures. For example, the radar-absorbing fiber-reinforced structure may include a first opposing electrode part 500*a* disposed between the first spacing structure 200*a* and the second spacing structure 200*b*, and a second opposing electrode part 500*b* disposed between the second spacing structure 200*b* and the radar-entering part 300.

In an embodiment, discharging spaces of the first spacing structure 200*a* and the second spacing structure 200*b* may have different shapes or different widths.

Radar-absorbing fiber-reinforced structures according to embodiments may increase a radar-absorbing ability for various bands of an electromagnetic wave in response to various discharging conditions. For example, radar-absorbing fiber-reinforced structures according to embodiments may increase a radar-absorbing ability by at least about 1 dB with compared to a radar-absorbing fiber-reinforced structure not using plasma, and may increase a radar-absorbing ability by at most about 20 dB depending on conditions.

Embodiments are not limited to radar-absorbing fiber-reinforced structures including a spacing structure. For example, a radar-absorbing fiber-reinforced structure according to an embodiment may consist of a fiber composite discharging part 100 and a radar-entering part 300 without a spacing structure as illustrated in FIG. 2B. In the radar-absorbing fiber-reinforced structure having such configuration, a conductive fiber bundle may function to selectively reflect or transmit an electromagnetic wave depending on a frequency thereof thereby achieving a first stealth function. Furthermore, plasma discharged outside may achieve a second stealth function.

Figure 20:
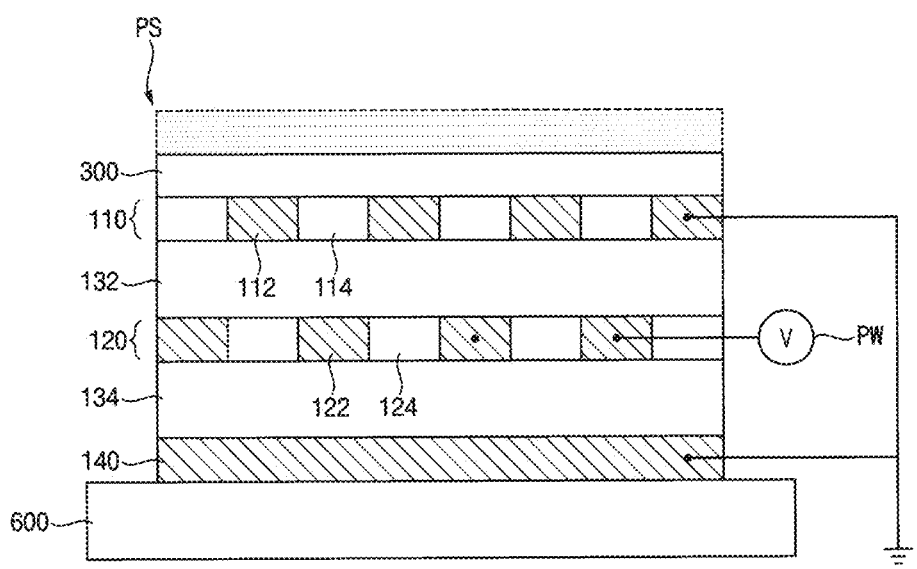

Referring to FIG. 20, a radar-absorbing fiber-reinforced structure may include a fiber composite discharging part and a radar-entering part 300. The fiber composite discharging part may include a first electrode part 110, a second electrode part 120, a first dielectric layer 132, a second dielectric layer 134 and a third electrode part 140. The first dielectric layer 132 may be disposed between the first electrode part 110 and the second electrode part 120. The second dielectric layer 134 may be disposed between the second electrode part 120 and the third electrode part 140.

In an embodiment, the first electrode part 110 and the second electrode part 120 may have a configuration same as or similar to the first electrode part and the second electrode part, which are illustrated in FIG. 2A. For example, at least one of the first electrode part 110 and the second electrode part 120 may include a fabric structure including a conductive fiber and a non-conductive fiber. The third electrode part 140 may include a conductor not having a fiber shape. For example, the third electrode part 140 may include a metal foil, a metal mesh or the like. For example, the third electrode part 140 may contact a surface of a body 600 such as airframe. The first electrode part 110 and the third electrode part 140 may be grounded through the surface of the body 600. A power supplier PW may be connected to the second electrode part 120.

The radar-entering part 300 may prevent or reduce physical/thermal damage to the fiber composite discharging part. Plasma may be discharged on a surface of the radar-entering part 300 by the fiber composite discharging part.

The third electrode part 140 may have a continuous plate (or sheet) shape thereby preventing an electric field formed by the fiber composite discharging part from being applied to the body 600.

Figure 21:
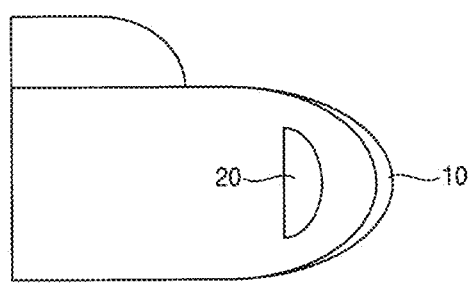
FIG. 21 is a schematic view illustrating an airplane including a radar-absorbing fiber-reinforced structure according to an embodiment.
Figure 22:
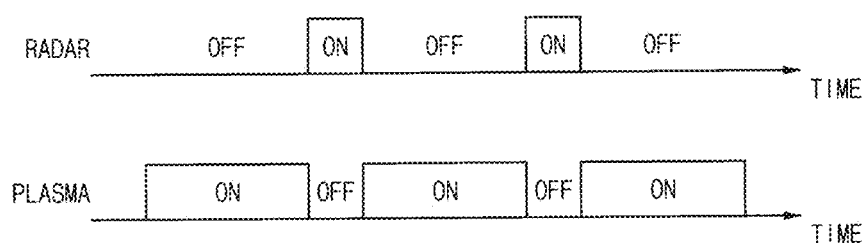
FIG. 22 illustrates operation of a stealth system according to an embodiment.

FIG. 21 is a schematic view illustrating an airplane including a radar-absorbing fiber-reinforced structure according to an embodiment. FIG. 22 illustrates operation of a stealth system according to an embodiment.

Referring to FIG. 21, a radar-absorbing fiber-reinforced structure according to an embodiment may be implemented for an airplane (an aircraft). For example, the radar-absorbing fiber-reinforced structure 10 may be applied to a front-body, a wing, an after-body or the like, of an airplane.

In an embodiment, the radar-absorbing fiber-reinforced structure 10 may cover the front-part in which a pulse-radar detection apparatus 20.

When the radar-absorbing fiber-reinforced structure 10 is designed to cover the pulse-radar detection apparatus 20, operation of the radar-absorbing fiber-reinforced structure 10 may be synchronized with operation of the pulse-radar detection apparatus 20 to prevent detection of the pulse-radar detection apparatus 20 from being inhibited.

For example, a stealth system according to an embodiment may include a radar-absorbing fiber-reinforced structure 10 adjacent to the pulse-radar detection apparatus 20. In the stealth system, the radar-absorbing fiber-reinforced structure may generate plasma PLASMA ON in a period RADAR OFF when the pulse-radar detection apparatus 20 is not operated, and may not generate plasma PLASMA OFF in a period RADAR ON when the pulse-radar detection apparatus 20 is operated. As a result, deterioration of performance of the pulse-radar detection apparatus 20 may be prevented.

Embodiments of the present invention may be used for achieving a stealth system for aircrafts, vessels, mobile vehicles or the like.

The foregoing is illustrative and is not to be construed as limiting thereof. Although a few embodiments have been described, those skilled in the art will readily appreciate that many modifications are possible in the embodiments without materially departing from the novel teachings, aspects, and advantages of the invention. Accordingly, all such modifications are intended to be included within the scope of this disclosure.

What is claimed is:

1. A radar-absorbing fiber-reinforced structure comprising a fiber composite discharging part, the fiber composite discharging part including a first electrode part and a second electrode part, which are spaced apart from each other by a dielectric layer and are connected to a power supplier or grounded to receive different voltages, wherein the fiber composite discharging part is configured to discharge plasma in response to a voltage difference between a voltage applied to the first electrode part and a voltage applied to the second electrode part, thereby changing a reflected wave or transmitted wave of a radar incident on the radar-absorbing fiber-reinforced structure to reduce reflectivity of the radar, wherein the first electrode part includes a first group of conductive fibers, which are grounded, the second electrode part includes a second group of conductive fibers, which are electrically insulated from and spaced apart from the first group of conductive fibers and connected to the power supplier, the first group and the second group of conductive fibers extend in a direction parallel to a surface on which the radar is incident, and at least one of the first electrode part and the second electrode part include a conductive fiber having a tensile strength equal to or more than 0.5 GPa.

2. The radar-absorbing fiber-reinforced structure of claim 1, at least one of the first electrode part and the second electrode part include a fabric structure including a non-conductive fiber bundle.

3. The radar-absorbing fiber-reinforced structure of claim 1, further comprising a radar-entering part disposed on a front surface of the fiber composite discharging part.

4. The radar-absorbing fiber-reinforced structure of claim 3, wherein the radar-entering part includes a radar-absorbing material.

5. The radar-absorbing fiber-reinforced structure of claim 3, wherein the radar-entering part includes a fiber-reinforced plastic material.

6. The radar-absorbing fiber-reinforced structure of claim 3, wherein the radar-entering part includes a non-conductive material.

7. The radar-absorbing fiber-reinforced structure of claim 3, further comprising a spacing structure disposed between the fiber composite discharging part and the radar-entering part and including a discharging space for plasma.

8. The radar-absorbing fiber-reinforced structure of claim 7, wherein the spacing structure includes an opening to form the discharging space and having a honeycomb shape.

9. The radar-absorbing fiber-reinforced structure of claim 7, wherein the spacing structure includes a first spacing structure and a second spacing structure, which are disposed in different layers.

10. The radar-absorbing fiber-reinforced structure of claim 9, wherein the first and second spacing structures have different sizes or different shapes so that a plasma density in the first spacing structure is different from a plasma density in the second spacing structure.

11. The radar-absorbing fiber-reinforced structure of claim 7, wherein the spacing structure is sealed and connected to a pressure-adjusting apparatus to control a pressure in the discharging space.

12. The radar-absorbing fiber-reinforced structure of claim 7, wherein the spacing structure includes a pressure-adjusting portion connected to an outside to adjust a pressure in the discharging space in response to a pressure of an outside.

13. A stealth system comprising:
a radar-absorbing fiber-reinforced structure of claim 1; and
a pulse-radar detection apparatus adjacent to the radar-absorbing fiber-reinforced structure,
wherein the radar-absorbing fiber-reinforced structure is operated to generate plasma when a pulse-radar is not emitted by the pulse-radar detection apparatus.

* * * * *